US008578075B1

(12) United States Patent
Ferrucci et al.

(10) Patent No.: US 8,578,075 B1
(45) Date of Patent: Nov. 5, 2013

(54) PERFORMANCE CONSTRAINTS FOR SYSTEM SYNTHESIS (75) Inventors: Aaron Ferrucci, Santa Cruz, CA (US); Silvio Brugada, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 658 days.

(21) Appl. No.: 11/674,076

(22) Filed: Feb. 12, 2007

(51) Int. Cl.
*G06F 13/12* (2006.01)

(52) U.S. Cl.
USPC .......................................................... 710/62

(58) Field of Classification Search
USPC .......................................................... 710/62
See application file for complete search history.

(56) References Cited

U.S. PATENT DOCUMENTS

| 6,744,274 | B1 * | 6/2004 | Arnold et al. | 326/16 |
| 6,820,117 | B1 * | 11/2004 | Johnson | 709/223 |
| 7,336,617 | B1 * | 2/2008 | Liu | 370/252 |
| 7,392,498 | B1 * | 6/2008 | Srinivasan et al. | 716/16 |
| 7,426,709 | B1 * | 9/2008 | Ganesan | 716/16 |
| 2005/0182848 | A1 * | 8/2005 | McNeil et al. | 709/235 |
| 2006/0253762 | A1 * | 11/2006 | Schalick | 714/742 |

OTHER PUBLICATIONS

Compaq, Hewlett-Packard, Intel, Lucent, Microsoft, NEC, and Philips, "Universal Serial Bus Specification 2.0—chapter 4, Architectural Overview", Apr. 27, 2000, pp. 15-24.

* cited by examiner

*Primary Examiner* — Henry Tsai
*Assistant Examiner* — Juanito Borromeo
(74) *Attorney, Agent, or Firm* — Kwan & Olynick LLP (57) ABSTRACT Methods and apparatus are provided for receiving performance constraints for implementing a system. A system tool receives constraints such as throughput, latency, power consumption, resource usage, etc. and generates an interconnection fabric using the constraint information. The interconnection fabric includes ports adapters used to connect master components and slave components. In some instances, port adapters and components are intelligently selected and connected using the constraint information.

21 Claims, 10 Drawing Sheets

PERFORMANCE CONSTRAINTS FOR SYSTEM SYNTHESIS

DESCRIPTION OF RELATED ART

The present disclosure relates to system synthesis. In one example, the present disclosure relates to methods and apparatus for efficiently implementing a system including an interconnection fabric on a programmable chip.

A system synthesizer creates a bus fabric from a high-level description. The description may include a collection of intellectual property (IP) blocks and their associated interconnections. An interconnection fabric or a bus fabric allows communication between various connected blocks and provides translation between incompatible transaction protocols where needed.

In many instances, an interconnection fabric can be implemented in a variety of manners. For example, port adapters connecting master components to slave components may be dedicated or shared. Higher latency components may be selected in place of lower latency components. It is often difficult to generate an appropriate system based on user needs.

Techniques and mechanisms for generating a system including an interconnection fabric have significant limitations. Consequently, it is desirable to provide improved methods and apparatus for generating a system.

OVERVIEW

Methods and apparatus are provided for receiving performance constraints for implementing a system. A system tool receives constraints such as throughput, latency, power consumption, resource usage, etc. and generates an interconnection fabric using the constraint information. The interconnection fabric includes ports adapters used to connect master components and slave components. In some instances, port adapters and components are intelligently selected and connected using the constraint information.

In one embodiment, a technique is provided. Components for implementation on a programmable chip are received. The components include a first master component port and a first slave component port. A throughput constraints associated with communication between the first master component port and the first slave component port is also received. A first port adapter component is selected from a library of port adapter components using the throughput constraint. An interconnection fabric is generated using the first port adapter component to connect the components for implementation on the programmable chip.

In another embodiment, a system is provided. The system includes an interface and a processor. The interface is operable to receive components for implementation on a programmable chip and a throughput constraint. The components include a first master component port and a first slave component port. The throughput constraint is associated with communication between the first master component port and the first slave component port. The processor is operable to select a first port adapter component from a library of port adapter components using the throughput constraint and generate an interconnection fabric using the first port adapter component to connect the components for implementation on the programmable chip.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable devices. However, it should be noted that the techniques of the present invention can be applied to a variety of different applications and a variety of different devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Master and slave components in an embedded system have master and slave ports that allow interconnection. For example, a master component processor may have a number of ports including master ports, slave ports, and test ports that allow the processor to interact with other components such as memory, network interfaces, etc. Other master components such as hardware accelerators can also have a number of ports including master ports, slave ports, and test ports that allow interaction with other components. The individual ports support particular bus standards such as PCI or AMBA and also have particular attributes such as width and bursting attributes.

In many conventional systems, port compatibility in a system is ensured by using only intellectual property (IP) blocks that implement components with ports that conform to a particular standard or have particular characteristics. Alternatively, port adapters can be inserted to allow communication between previously incompatible port characteristics. Any characteristics or parameters associated with a component connection to a bus or other interconnection fabric are referred to herein as port characteristics.

In some systems, adapters of various types are automatically inserted into an interconnection fabric, such as an Avalon Bus Fabric associated with System on a Programmable Chip (SOPC) Builder available from Altera Corporation of San Jose, Calif. In many examples, an adapter is itself an IP block that has an interconnection slave interface and an interconnection master interface. The adapter can be configured to perform operations such as translation from one protocol to another, insertion of pipelining registers in an attempt to improve system clock rates at the expense of latency, and/or allow communication on a path where a direct connection is impossible, e.g. a clock crossing adapter. The ability to optimize an interconnection fabric, however, are somewhat limited.

According to various embodiments, a bridge component can be used to tune a system to meet user constraints. Insertion of the bridge is an explicit statement from the user that high throughput and simultaneous access is not required between a set of masters and slaves. It is believed that improved system clock rates and reduced logic consumption will result. According to various embodiments, an arbitration priority can also be used to tune the system. SOPC Builder allows specification of "arbitration priority", which influences the number of transactions each master component gets from a particular slave component. This priority or share, however, works only in units of slave transactions, rather than in units of transactions per unit time. A system can also be tuned based on selection of clock frequencies. SOPC Builder allows the user to specify a system clock frequency. This clock frequency may be determined by invariable parameters of the environment in which the system is implemented. However, given the availability of onchip phase lock loops, (PLLs), oftentimes the system designer may raise or lower the clock frequency independently of off-chip resources, providing better performance (with a higher clock rate) or lower power consumption and radiated electrical noise (with a lower clock rate).

The techniques and mechanisms of the present invention recognize that interconnection fabrics are often generated in manners that do not meet user requirements. Designs often have to be generated, tested and regenerated in order to meet user constraints. A tool such as SOPC Builder makes choices about adapter insertion in the absence of user guidance. This may result in optimizations on non-critical system paths. These optimizations consume logic and may actually harm system throughput. Also, it often happens that a single adapter could be shared among multiple connections, but sharing an adapter might reduce logic consumption at the expense of system clock rates. Consequently, the techniques of the present invention provide mechanisms for more optimally configuring a system interconnection fabric. User constraints such as throughput, latency, power consumption, etc. are received and evaluated.

The user constraints are used to generate a customized interconnection fabric for connecting multiple master and slave component in a programmable chip system. In one particular example, user constraints such as throughput, latency, resource consumption, and power usage constraints are provided to a synthesis tool for generating a system on a programmable chip. In another particular example, a system designer provides throughput and latency requirements directly to a system on a programmable chip builder tool. The system designer no longer has to worry about clock frequency or arbitration priorities, characteristics that do not guarantee any measure of actual performance. Designers typically need a device to provide a certain amount of throughput, or respond within a certain period of time. Consequently, it is useful for a designer to input constraints such as throughput and latency and for a system tool to generate an interconnection fabric that meets designer constraints. In some instances, constraints may include global settings such as resource consumption and power consumption. Maximum resource consumption may limit an interconnection fabric to a particular number of logic blocks, memories, DSP blocks, PLLs, etc. Maximum power consumption may limit the maximum power consumed, as a function of system resource consumption and clock frequencies. A user may also input clock domain settings, such as an "any frequency" setting that allows system synthesis to find the lowest frequency that meets other constraints, thus minimizing power consumption and noise emissions.

Constraints may also include module settings, such as total throughput on all connection points and latency, such as maximum peak latency over all connection points and maximum average latency over all connection points. Constraints may also include connection settings including throughput, such as transactions/second (absolute), transactions/cycle (relative to system clock frequency), and percentage of total bandwidth (like existing "arbitration priority"). Latency such as maximum average and maximum peak latency can also be evaluated.

It should be noted that constraints include both deterministic and non-deterministic constraints. Deterministic constraints can be upheld in a guaranteed manner. Examples of such constraints are minimum clock frequency, throughput as a percentage of total bandwidth (guaranteed by arbitration logic) and maximum peak latency on components with a fixed latency.

Other performance constraints cannot be guaranteed deterministically, because they depend on factors external to the system synthesizer. Such constraints are called non-deterministic constraints. Examples include throughput in transactions/second to external memory subsystems (absolute performance depends on many factors, including memory geometry and specific pattern of access), power consumption (may vary according to data content) and maximum latency (for variable-latency components). Dynamic constraints can be measured in-system with suitable performance monitors, with feedback provided manually or automatically into the design process. Alternately, in-system performance measurements can be channeled at run-time into logic which is designed to meet the dynamic constraint.

For example, suppose a connection requires an absolute throughput of N transactions/second. When average throughput exceeds this rate, an arbitration module may penalize the connection. When average throughput falls below this rate, the arbitration module may favor the connection (at the expense of other connections on the same connection point). In this way the system will adapt to factors outside of its control, with the intent of meeting the given performance constraint without statically designing it to meet the worst case.

Although it is possible to vary particular system characteristics such as the size of on-chip memories, clock rates by clock domain, arbitration priority by master-slave connection, CPU cache size, custom instructions, tightly-coupled memories, DMA buffer size, all of these features are implementation-specific ways of indirectly influencing system throughput, power consumption, maximum system frequency, and other system properties. Unfortunately, when these properties are modified, unintended or unexpected side effects may result. A user may change a memory latency to 1 cycle, but this may have the unintended consequence of reducing system maximum frequency, and canceling out a throughput benefit.

Various examples of the present invention provide a higher-level, more user-intuitive method for specifying the actual system requirements, independent of obscure implementation details. In one example, the user would specify a minimum absolute throughput constraint (transactions/second) on the memory connection point of interest, and leave other constraints such as clock rate unassigned. During system synthesis, the tool would analyze the user requirements and fixed resources, and attempt to generate a system which meets all requirements. The tool is able to vary memory latency, clock frequency, arbitration priorities and any other relevant implementation-specific assignments to achieve the desired performance.

Figure 1:
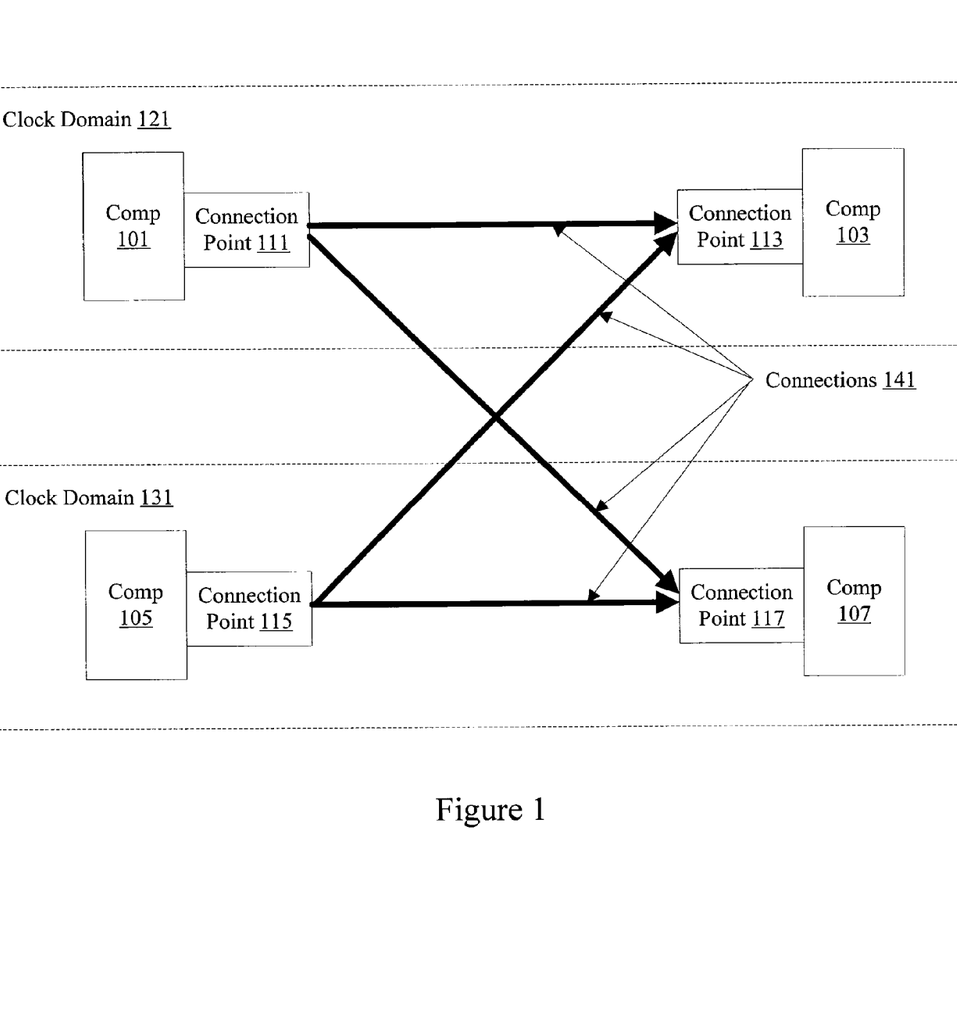
FIG. 1 is a diagrammatic representation of a programmable chip.

FIG. 1 is a diagrammatic representation showing one example of a system that can use the techniques of the present invention. According to various embodiments, a system synthesis tool can take individual components and generate an interconnected system. In some examples, the system includes components 101, 103, 105, and 107. Examples of components include processor cores, hardware accelerators, peripheral devices, peripheral interfaces, and other modules. The various components 101, 103, 105, and 107 are associated with ports or connection points 111, 113, 115, and 117.

Connections 141 link the various connection points. According to various embodiments, connections 141 may have to include slave side arbitrators, port adapters, bridges, etc. For example, clock domain crossing adapters may be needed since components 101 and 103 reside in clock domain 121 while components 105 and 107 reside in clock domain 131. According to various embodiments, the connections are associated with an interconnection fabric. Any mechanism or logic for connecting components in a system is referred to herein as an interconnection fabric or bus.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip with automatic port adapter selection and configuration.

Figure 2:
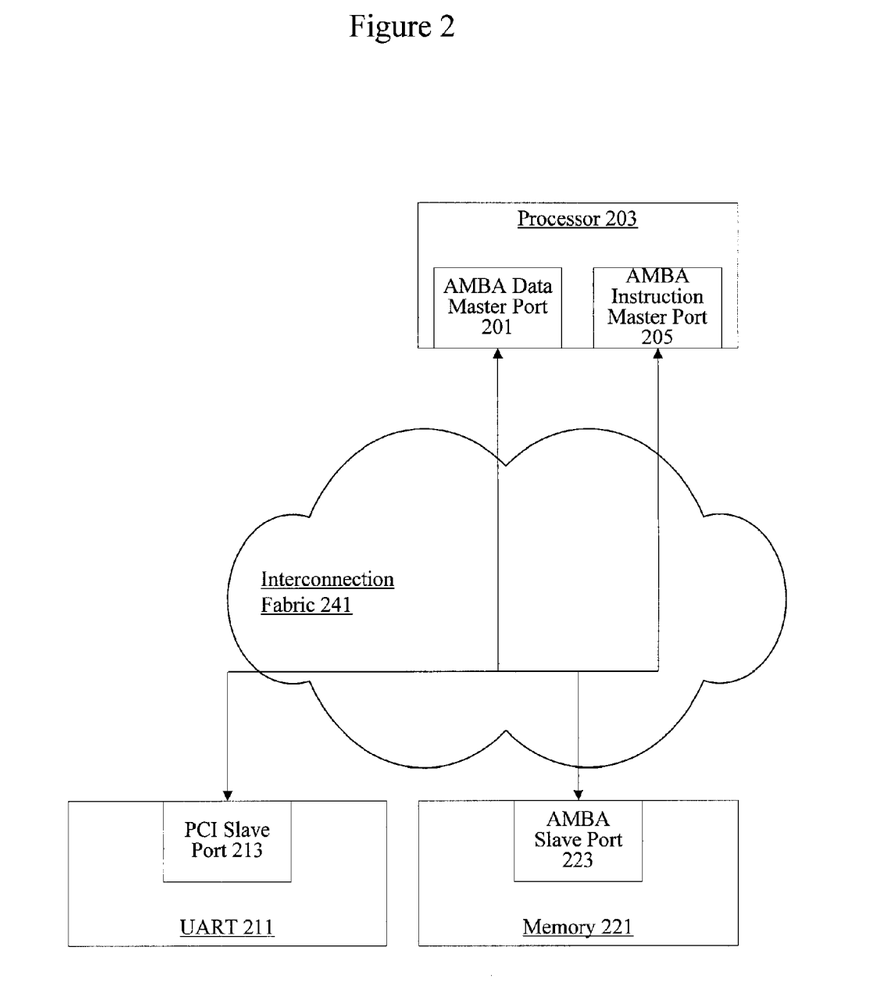
FIG. 2 is a diagrammatic representation showing master ports and slave ports associated programmable chip processor and peripherals.

FIG. 2 is a diagrammatic representation showing one example of a system having components with different ports. A processor 203 includes an Advanced Microprocessor Bus Architecture (AMBA) data master port 201 and an AMBA instruction master port 205. AMBA is an established on-chip bus standard that serves as an interconnect for a number of System-on-Chip (SoC) designs. AMBA provides structure for intellectual property (IP) component development. A variety of components include AMBA ports and compliance with the AMBA standard allows connection of a variety of components without understanding of the intricacies associated with other components.

The AMBA instruction master port 205 and the AMBA data master port 201 are connected to an AMBA slave port 223 associated with a memory component 221 over an interconnection fabric 241. The interconnection fabric can include one or more bus controllers or bus arbiters. A UART 211 has a Peripheral Component Interface (PCI) slave port 213. In some examples, a UART 211 may be configured with both AMBA slave ports and a PCI slave port 213. However, this may make the UART 211 more complicated and require more logic to implement the UART 211 on a programmable device. Consequently, the UART 211 may only be provided with a PCI slave port 213.

Designers typically custom configure logic to allow connection of the UART 211 and the associated PCI slave port 213 to the processor 203 and its associated AMBA port. Custom configured logic can be error prone and inefficient.

Figure 3:
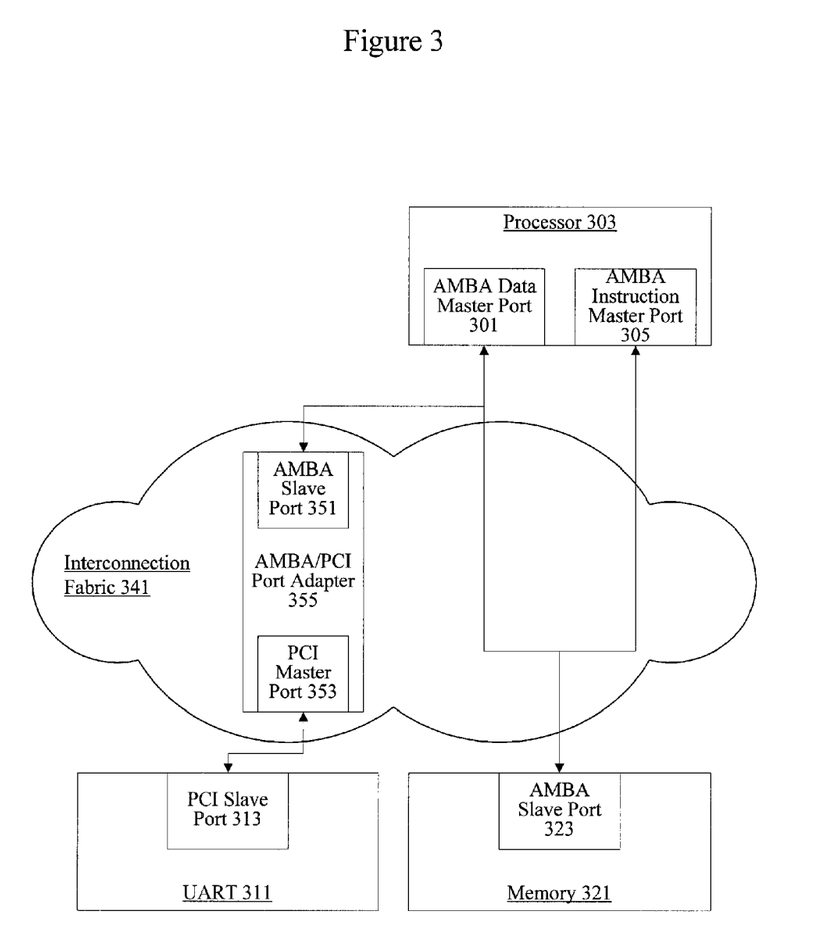
FIG. 3 is a diagrammatic representation showing port adapter components

FIG. 3 is a diagrammatic representation showing use of a port adapter available from a port adapter library. Any mechanism holding logic such as IP blocks for implementing port adapters on a device is referred to herein as a port adapter library. In one embodiment, a port adapter library is a database that includes bus type adapters, bit width adapters, bursting adapters, clock domain crossing adapters, etc.

A processor 303 includes an Advanced Microprocessor Bus Architecture (AMBA) data master port 301 and an AMBA instruction master port 305. The AMBA instruction master port 305 and the AMBA data master port 301 are connected to an AMBA slave port 323 associated with a memory component 321 over an interconnection fabric 341. The interconnection fabric 341 can include one or more bus controllers or bus arbiters. A UART 311 has a Peripheral Component Interface (PCI) slave port 313. In some examples, a UART 311 may be configured with both AMBA slave ports and a PCI slave port 313. However, this may make the UART 311 more complicated and require more logic to implement the UART 311 on a device. Consequently, the UART 311 may only be provided with a PCI slave port 313.

According to various embodiments, the techniques of the present invention automatically select an AMBA/PCI port adapter 355 from a library of port adapters. The AMBA/PCI port adapter 355 includes an AMBA slave port 351 and a PCI master port 353. The port adapter PCI master port 353 is connected to PCI slave port 313 associated with UART 311. The port adapter AMBA slave port 351 is connected to the AMBA data master port 301 associated with processor 303. The preconfigured port adapter 355 reduces complexity in implementing a device. However, it is recognized that latency and/or throughput may be compromised. Consequently, it is contemplated that a user or designer can provide constraints such as latency and/or throughput constraints so that a system builder or system synthesis tool can more intelligently select the appropriate port adapters or the appropriate interconnection fabric configuration.

A variety of port adapters are available. In another example, a processor 303 has a word-wide data master port, and it needs to connect to a peripheral that has a byte-wide slave port. The system design tool can select a word-to-byte adapter from its library and insert the adapter based on constraint information from the designer.

The examples above describe point-to-point connections without "fan out" or "fan in." Such connections can be resolved easily using adapters from a library and a backtracking search algorithm. According to various embodiments, an algorithm iteratively inserts candidate adapters from a library until the desired connection is possible. If necessary, when no adapter is available that directly connects the port types, the algorithm can search for a chain of adapters or stages of adapters. The algorithm can search for the adapter chain that resolves the connection with a minimum cost. According to various embodiments, costs are assigned to various adapters in the port adapter library. Costs may be associated with the amount of logic consumed on a device, latency introduced, etc. A solution with the lowest total cost may be selected.

Figure 4:
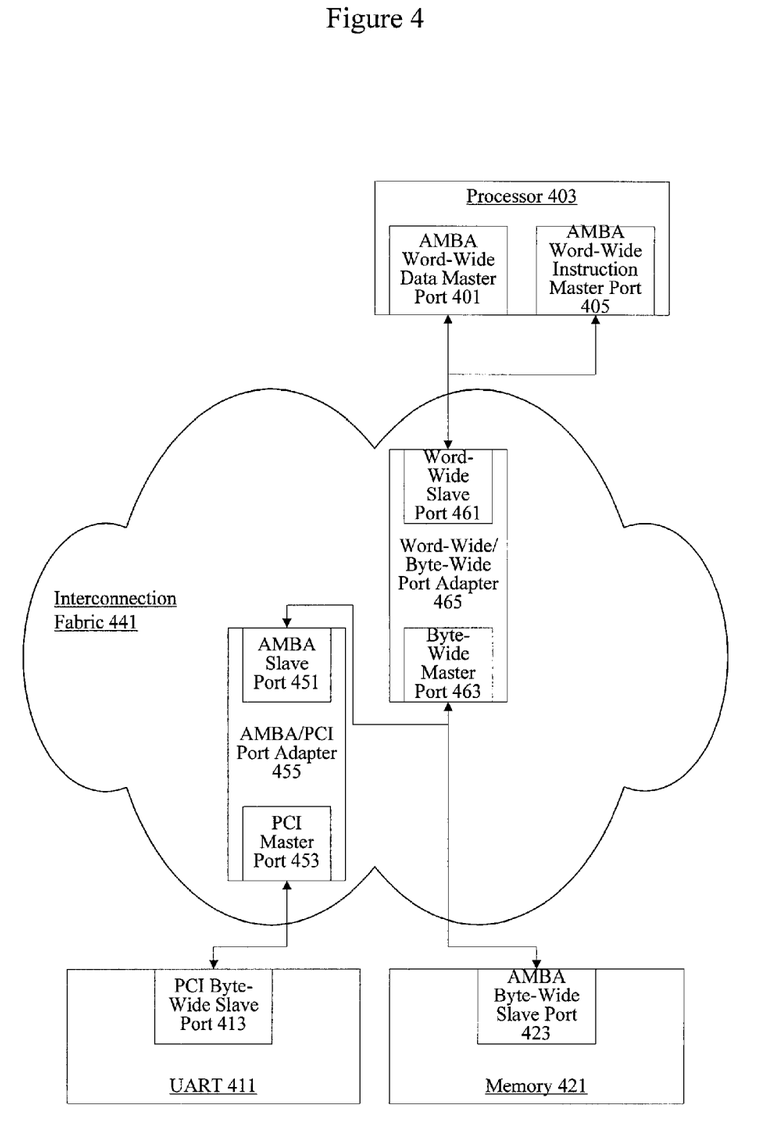
FIG. 4 is a diagrammatic representation showing a port adapter chain.

FIG. 4 is a diagrammatic representation showing one example of port adapter chaining. A processor 403 includes an Advanced Microprocessor Bus Architecture (AMBA) word-wide data master port 401 and an AMBA word-wide instruction master port 405. The AMBA word-wide instruction master port 405 and the word-wide AMBA data master port 401 are connected to an AMBA word-wide slave port 461 associated with a word-wide/byte-wide port adapter 465 included in an interconnection fabric 441. According to various embodiments, the word-wide/byte-wide port adapter 465 has AMBA ports. The word-wide/byte-wide port adapter 465 also includes a byte-wide master port 463.

The byte-wide master port 463 associated with the word-wide/byte-wide port adapter 465 is connected to an AMBA byte-wide slave port 423 associated with memory 421. However, the byte-wide master port 463 can not be connected to the PCI byte-wide slave port 413 because of bus type incompatibility. Consequently, the word-wide/byte-wide port adapter 465 is chained to an AMBA/PCI port adapter 455 to allow connection to UART 411. The byte-wide master port 463 is connected to AMBA slave port 451 associated with AMBA/PCI port adapter 455. The AMBA/PCI port adapter 455 also includes a PCI master port 453. The PCI master port 453 is connected to the PCI byte-wide slave port 413. According to various embodiments, the AMBA/PCI port adapter 455 has byte-wide ports.

Sharing of adapters is encouraged by considering total cost. A system implemented using fewer adapters will generally have lower total cost. However, in some instances, sharing too extensively can adversely impact system performance. In some instances, the port adapter itself may become a system bottleneck. In one example, port adapters may be shared by a maximum of three or four components. In another example, a port adapter is not shared if it is used by a high bandwidth component.

Figure 5:
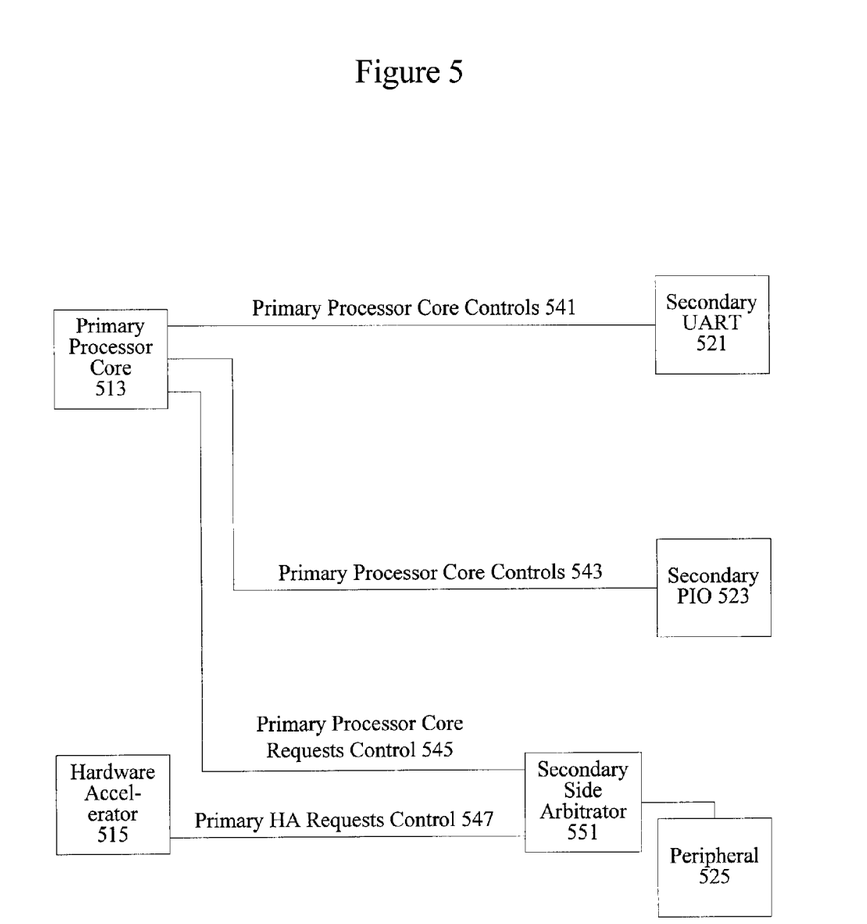
FIG. 5 is a diagrammatic representation showing an interconnection fabric.

A variety of interconnection fabrics can be used. FIG. 5 is a diagrammatic representation showing one example of an interconnection fabric. Although a slave side arbitration fabric is described, the techniques and mechanisms of the present invention can be implemented using other interconnection fabrics and buses. Any system level mechanism used to connected master and slave components is referred to herein as an interconnection fabric or bus. Any component or device that is operable to initiate read and write operations by providing control information is referred to herein as a master component. Master components are sometimes referred to as master components. Control information can include a particular address associated with a slave component. Any component or device that responds to read or write operations with information sent back to the master component regarding the read or write operation is referred to herein as a slave component. Slave components are sometimes referred to as slave components.

Some examples of master components are processors, microcontrollers, and Ethernet devices. Some examples of slave components are Universal Asynchronous Receiver Transmitters (UARTs), Parallel Input Output (PIO), program memory, and data memory. It should be noted that some components such as an Ethernet component can be both a master component and a slave component, as an Ethernet component has the capability of reading and writing to the slave program memory while also responding to instructions from a master system CPU.

The multiple master and slave components are connected using slave side arbitration, sometimes referred to as slave side arbitration, simultaneous multiple master components, or simultaneous multiple masters. A system using individual arbitrators that correspond to individual slave components accessible by more than one master component is referred to herein as a slave side arbitration system. Any component or device that is configured to ensure that only one master component can access any one of the slave components at any given time is referred to herein as a system bus arbitrator or bus arbitration logic. Various schemes such as weighted fairness can be implemented to improve the efficiency of slave component access, but such schemes can increase system complexity and latency. In conventional implementations, a computer system includes a single system bus arbitrator for each bus in the computer system.

A slave side arbitration system no longer requires a bus or a system bus arbitrator that prevents a second master component from accessing a second slave component when a first master component is accessing a first slave component. According to various embodiments a slave component such as peripheral interface 525 is associated with a slave side arbitrator 551. Logic and mechanisms for selecting an input based on a bus control signal are referred to herein as an arbitrator or arbitration logic. It should be noted that although switching circuitry generally can be implemented using multiplexers, a variety of mechanisms including switches and transistors can be used.

However, slave components UART 521 and PIO 523 are not associated with any arbitrator. In one example, slave component UART 521 and slave PIO 523 can only be accessed by master CPU 513 and not by master Ethernet device 515. A peripheral interface 525, however, can be accessed by both master CPU 513 and master Ethernet device 515.

According to various embodiments, a slave side arbitrator 551 allows a first slave component in a system to be accessed by a first master component at the same time a second slave component in the system is accessed by a second master component. For example, peripheral interface 525 can be accessed by master Ethernet 515 through slave side arbitrator 551 at the same time, slave UART 521 is accessed by master CPU 513.

By allowing a CPU to access a slave component at the same time another master component such as a streaming output device or an Ethernet component is accessing memory, bus bottlenecks can be reduced. By using the simultaneous multiple master component architecture, more direct connections between components can also be supported.

Although slave side arbitrators provide many benefits to programmable chip designers, arbitration logic efficiency is still needed to prevent performance degradation. It is also beneficial to provide priority considerations and fairness with any arbitration logic, slave side arbitration logic or otherwise. According to various embodiments, port adapters available from a port adapter library can be connected serially to slave side or slave side arbitrators.

Figure 6:
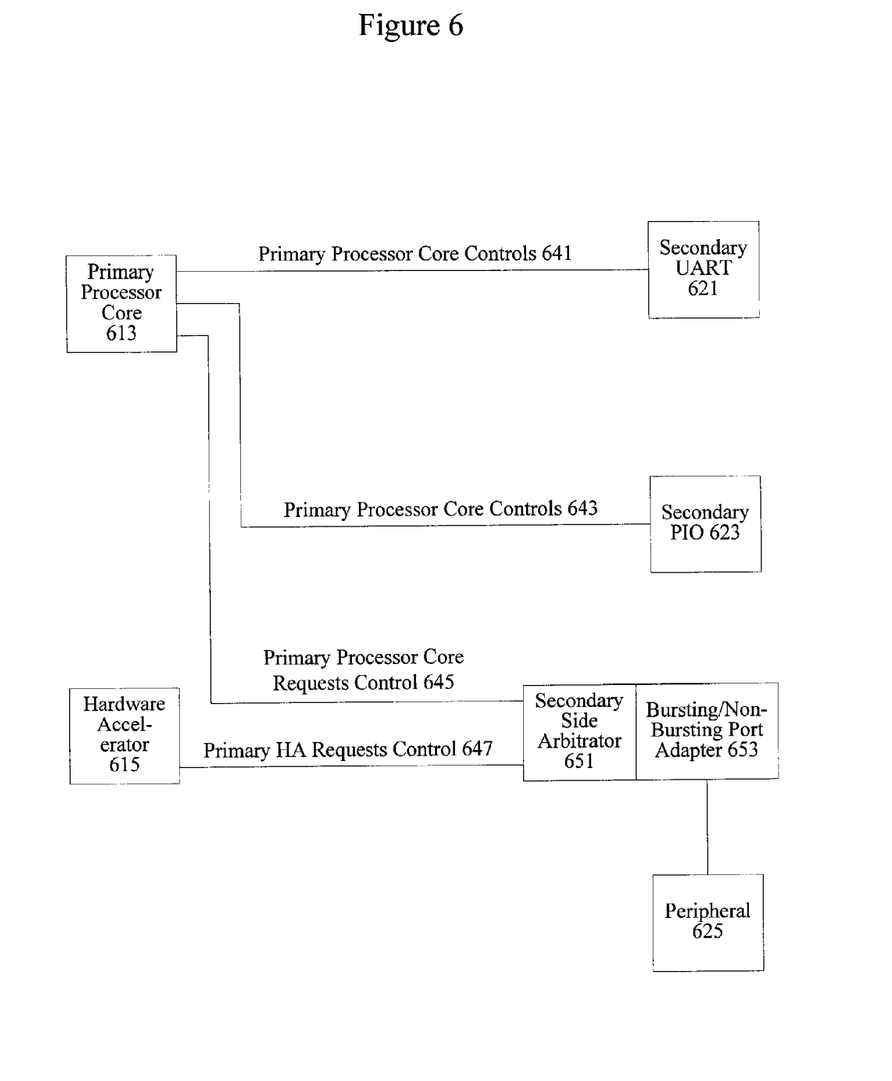
FIG. 6 is a diagrammatic representation showing port adapter components associated with arbitration logic.

FIG. 6 is a diagrammatic representation showing ports adapters integrated with slave side arbitrators. According to various embodiments a slave component such as peripheral interface 625 is associated with a slave side arbitrator 651 and a bursting/non-bursting port adapter 653.

However, slave components UART 621 and PIO 623 are not associated with any arbitrator. In one example, slave component UART 521 and slave PIO 623 can only be accessed by master CPU 613 and not by master Ethernet device 615. A peripheral interface 625, however, can be accessed by both master CPU 613 and master Ethernet device 615. Slave components UART 621 and PIO 623 may also be connected to port adapters as needed.

Figure 7:
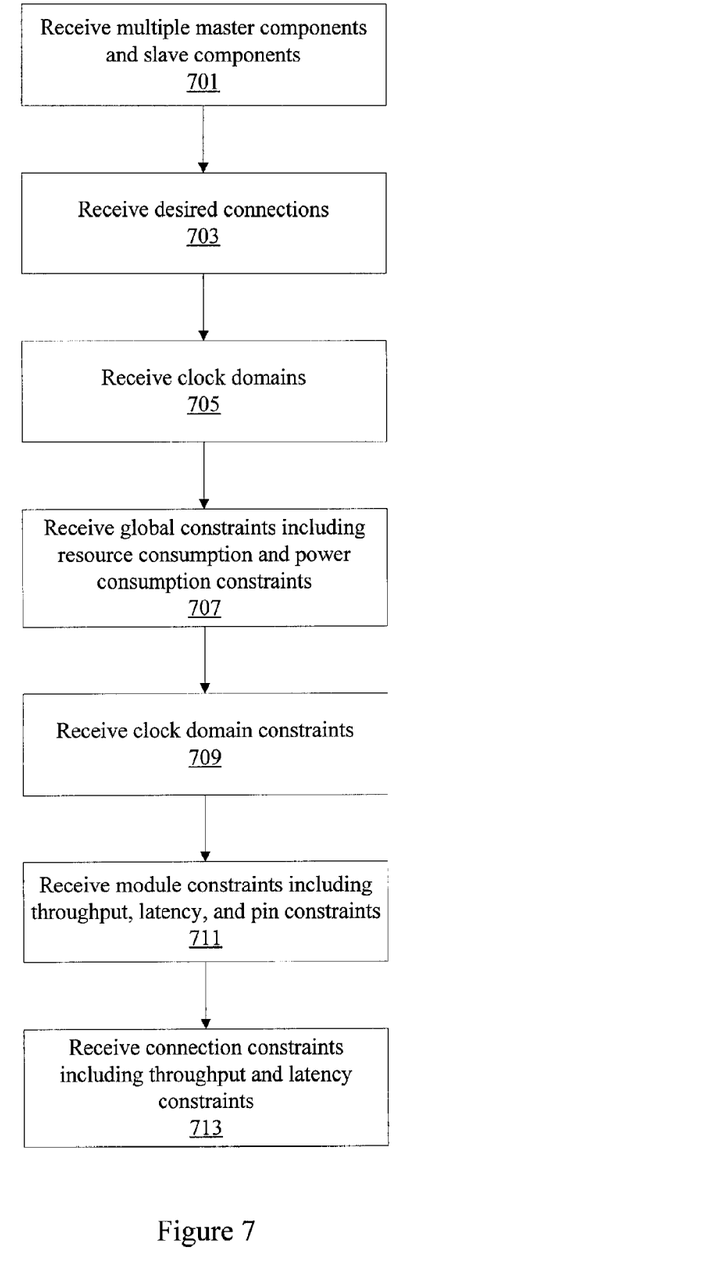
FIGS. 7 and 8 are flow process diagrams showing techniques for selecting port adapter components.

FIG. 7 is a flow process diagram showing on technique for receiving system synthesis constraint information. At 701, multiple master components and slave components are received. According to various embodiments, a user selects master components such as processors and hardware accelerators along with slave components such as timers, input output interfaces, memory, etc for implementation on a device. In particular examples, a user may specify a component generally or a specific component. At 703, desired connection information is received. For example, a user may specify that an Ethernet component should be connected to a timer, or a hardware accelerator and a processor should both be connected to memory. At 705, clock domain information is received. Some components may operate in one clock domain while other component may operate in a different clock domain.

In many applications, a system would then be generated using adapters that connect that various components and the disparate clock domains. However, it is noted that in many instances, a variety of adapters can be used and it is often difficult to determine which adapters to use. If a designer wants a system with a certain performance capability, the designer would typically have to specify parameters such as clock speed, which does not in itself meet real world performance criteria. For example, a device operating at a particular clock speed does not guarantee that it can handle a certain number of calls or process a certain number of video streams.

Consequently, the techniques of the present invention allow a designer to specify performance constraints that more directly affect real world performance. For example, a device having a particular throughput is often what is desired by a designer. At 707, global constraint information is received.

According to various embodiments, global constraints include resource consumption constraints and power consumption constraints. A system generator can use constraint information to more intelligently select port adapters for generating an interconnection fabric. It is also contemplated that the constraint information can be used to more intelligently select master components and slave components or to parameterize components in particular manner.

At 709, clock domain constraint information is received. In one example, a user may say that no constraints are required, so a system generator can use an adapter that allows the highest throughput or lowest latency. At 711, modules constraints relating to throughput, latency, and pin numbers are received. According to various embodiments, the throughput constraint relates to the total throughput on all connection points. The latency constraint could be the maximum peak or maximum average latency over all connection points. In some examples, module constraints are received separately from connection constraints. At 713, connection constraints including throughput and latency constraints are received. Throughput constraints may be provided in an absolute transactions/second setting, a transactions/cycle setting, or a percentage of total bandwidth setting. Latency may be specified as a maximum average or maximum peak latency.

Figure 8:
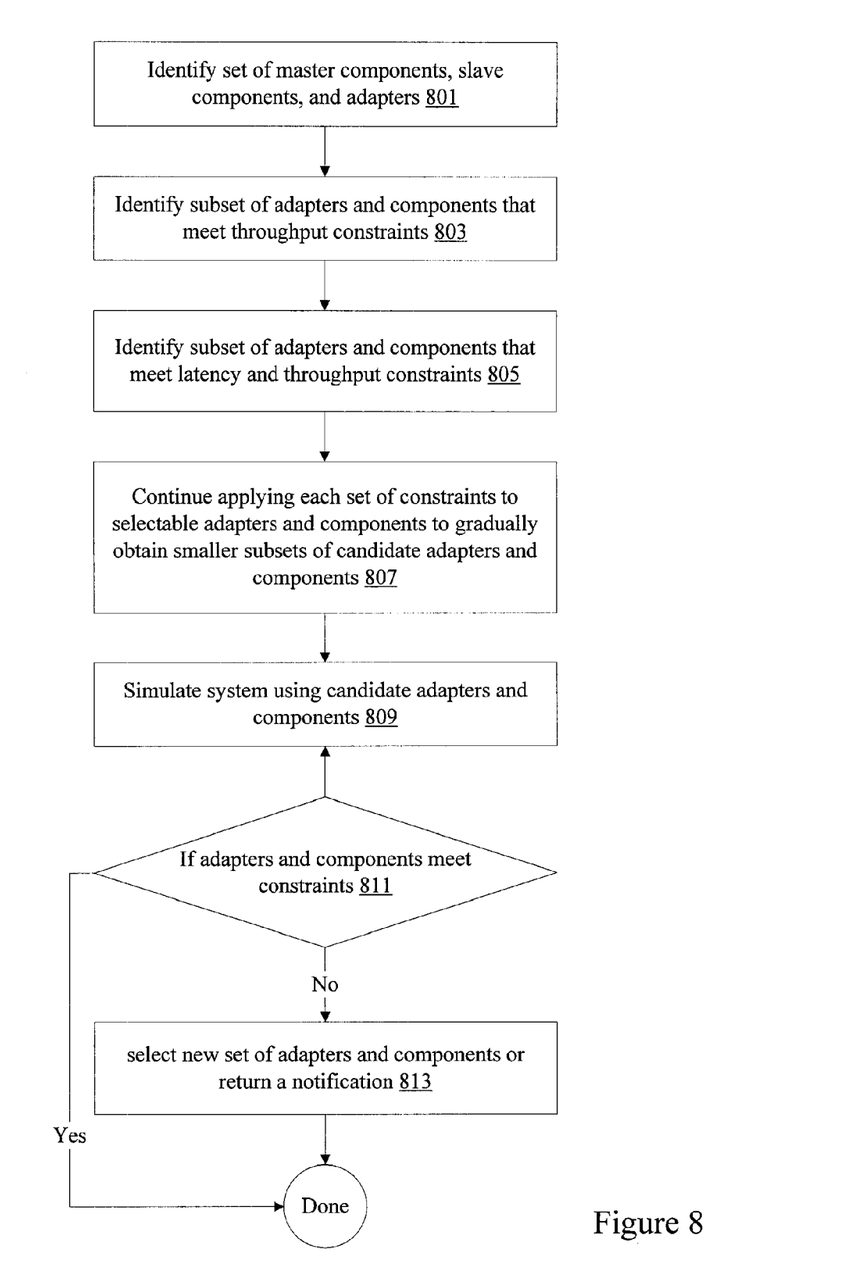

FIG. 8 is a flow process diagram showing one technique for generating an interconnection fabric. At 801, a set of master components, slave components, and adapters are identified. At 803, a subset of available adapters and components that meet user throughput constraints are identified. At 805, a subset of adapters and components that meet latency and throughput constraints are identified. According to various embodiments, each time a constraint is applied, the size of the set of allowable adapters and components decreases. Additional constraints are applied until only one or handful or adapters and components can meet constraints at 807. According to various embodiments, a user specifies which constraints are the most important and those constraints are applied first. If a subset can not be further narrowed, a notification or an error is returned. At 809, the system is simulated using candidate adapters and components. If the adapters and components meet constraints at 811, then the appropriate adapters have been selected. Otherwise, a new set of adapters is selected.

Figure 9:
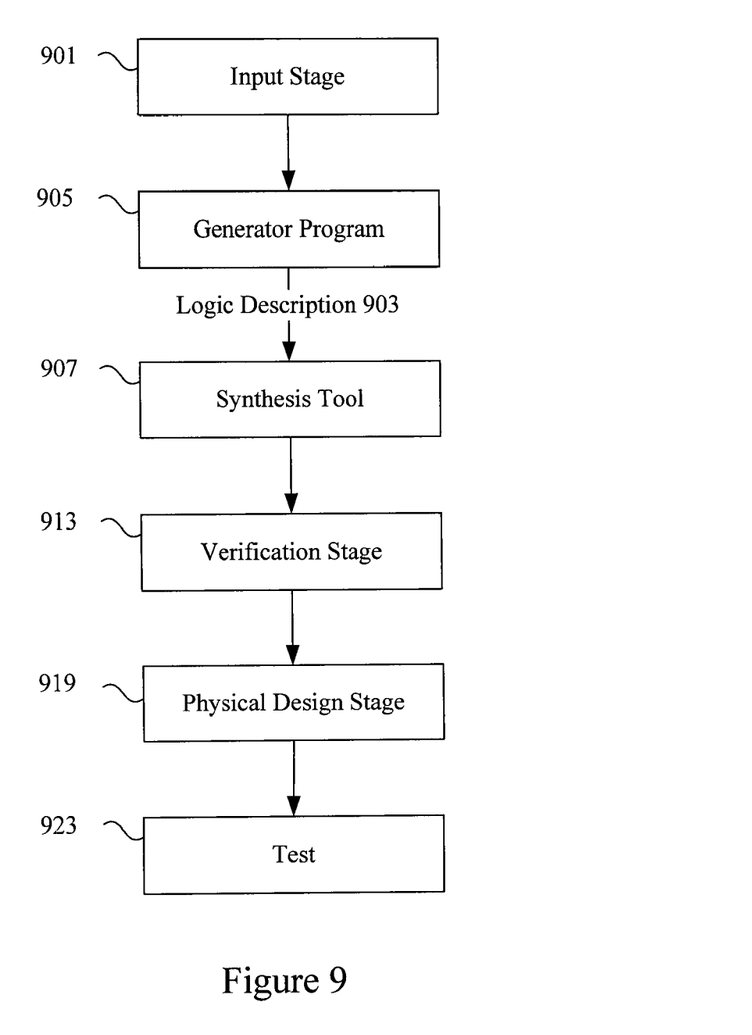
FIG. 9 is a diagrammatic representation showing a technique for implementing the programmable chip.

FIG. 9 is a diagrammatic representation showing implementation of an electronic device that can use arbitration logic according to various embodiments. An input stage 901 receives selection information typically from a user for logic such as a processor core as well as other components such as a streaming output device to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description to be implemented on an electronic device.

In one example, an input stage 901 often allows selection and parameterization of components to be used on an electronic device. The input stage 901 also allows configuration of variable or fixed latency support. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 905 identifies pointers and provides ports for each pointer. One tool with generator program capabilities is System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 909.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send messages directly to the generator program 905 to allow the generator program to create a logic description. Similarly, the generator program can provide information directly to the synthesis tool instead of writing HDL files. Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 907.

A synthesis tool 907 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 913 typically follows the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 919 including place and route and configuration tools. A place and route tool typically locates logic cells on specific logic elements of a target hardware device and connects wires between the inputs and outputs of the various logic elements in accordance with logic required to implement an electronic design. The device can also be physically tested at 923.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 901, the generator program 905, the synthesis tool 907, the verification tools 913, and physical design tools 919 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 10:
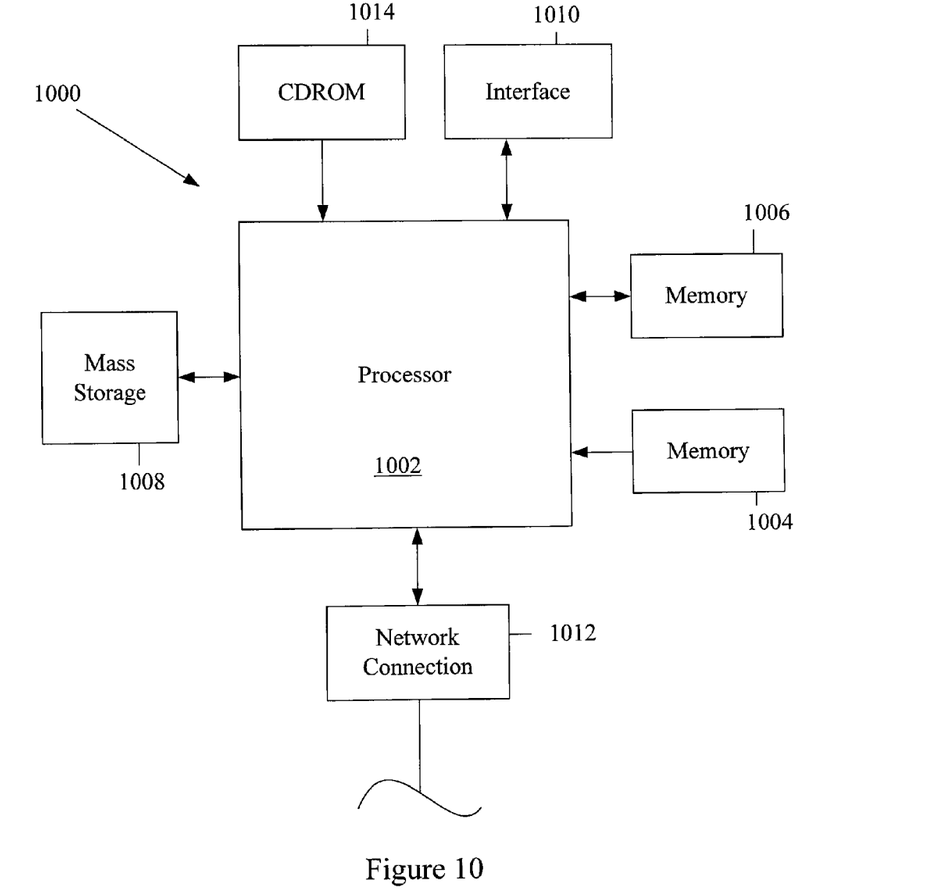
FIG. 10 is a diagrammatic representation depicting a computer system.

FIG. 10 is a diagrammatic representation showing a typical computer system that can be used to implement a programmable chip having bus arbitration with priority encoding and fairness. The computer system 1000 includes any number of processors 1002 (also referred to as central processing units, or CPUs) that are coupled to devices including memory 1006 (typically a random access memory, or "RAM"), memory 1004 (typically a read only memory, or "ROM"). The processors 1002 can be configured to generate a test sequences for any designated processor. As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a slave storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A specific mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. It should be noted that the system 1000 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1008 or 1014 and executed on CPU 1008 in conjunction with master memory 1006.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. Although shared I/O lines have been described in the context of a memory controller and a simultaneous multiple master component switch fabric, shared I/O lines can be used in a system without a memory controller and/or without a simultaneous multiple master component switch fabric. It is therefore intended that the invention be interpreted to include all variations and equivalents that fall within the true spirit and scope of the present invention.

What is claimed is:

1. A method comprising:
    receiving a representation of a plurality of components, along with component connection information that indicates how the components are to be coupled together, for implementation on a programmable chip, the plurality of components including a master component port and a slave component port and the component connection information indicating that the master component port is to be coupled with the slave component port, wherein the master component port has a bus characteristic that is incompatible with a bus characteristic of the slave component port;
    receiving a throughput constraint associated with communication between the master component port and the slave component port, wherein the throughput constraint was input as a high-level program representation;
    selecting a first bus port adapter component from a subset of bus port adapter components from a library of a plurality of bus port adapter components, wherein the subset of bus port adapter components are configured to allow communication between the master component port and the slave component port, using the throughput constraint to determine that the first bus port adapter component meets the throughput constraint while one or more other bus adapters of the subset of bus port adapters do not meet the throughput constraint; and
    generating a logic description of an interconnection fabric using the first bus port adapter component to couple the plurality of components for programming the programmable chip to comprise the plurality of components and the interconnection fabric.

2. The method of claim 1 further comprising receiving a latency constraint associated with communication between the master component port and the slave component port.

3. The method of claim 2, wherein the first bus port adapter component is selected using the throughput constraint and the latency constraint.

4. The method of claim 2, wherein the latency constraint is a maximum average latency.

5. The method of claim 2, wherein the latency constraint is a maximum peak latency.

6. The method of claim 1, wherein implementation specific assignments including memory latency, clock frequency, and arbitration priority are varied to meet throughput and latency constraints.

7. The method of claim 1, wherein the throughput constraint is a number of transactions per cycle.

8. The method of claim 1, wherein the throughput constraint is a number of transactions per second.

9. The method of claim 1, wherein the throughput constraint is a percentage of total bandwidth.

10. The method of claim 1 further comprising receiving a power constraint associated with communication between the master component port and the slave component port.

11. The method of claim 2, further comprising receiving a power constraint associated with communication between the master component port and the slave component port and wherein the first bus port adapter component is selected using the throughput constraint, the latency constraint, and the power constraint.

12. The method of claim 1 further comprising simulating operation of the plurality of components and the interconnection fabric to determine that operation meets the throughput constraint.

13. The method of claim 12 further comprising selecting a port adapter component in response to the operation not meeting the throughput constraint.

14. A system comprising:
    an interface operable to receive a plurality of components, along with component connection information that indicates how the components are to be coupled together, for implementation on a programmable chip, wherein the interface is further operable to receive a throughput constraint, and the plurality of components including a master component port and a slave component port, wherein the component connection information indicating that the master component port is to be coupled with the slave component port, wherein the master component port has a bus characteristic that is incompatible with a bus characteristic of the slave component port, and wherein the throughput constraint was input as a high-level program representation; and a processor operable to select a first bus port adapter component from a subset of bus port adapter components from a library of a plurality of bus port adapter components, wherein the subset of bus port adapter components are configured to allow communication between the master component port and the slave component port, using the throughput constraint to determine that the first bus port adapter component meets the throughput constraint while one or more other bus adapters of the subset of plurality of bus port adapters do not meet the throughput constraint, wherein the processor is further operable to generate a logic description of an interconnection fabric using the first bus port adapter component to couple the plurality of components for programming the programmable chip to comprise the plurality of components and the interconnection fabric.

15. The system of claim 14, wherein the interface is further operable to receive a latency constraint associated with communication between the master component port and the slave component port.

16. The system of claim 15, wherein the first bus port adapter component is selected using the throughput constraint and the latency constraint.

17. The system of claim 15, wherein the latency constraint is a maximum average latency.

18. The system of claim 15, wherein the latency constraint is a maximum peak latency.

19. A computer readable media having instructions stored therein that when executed by an electronic device performs a method comprising:

receiving a representation of a plurality of components, along with component connection information that indicates how the components are to be coupled together, for implementation on a programmable chip, the plurality of components including a master component port and a slave component port and the component connection information indicating that the master component port is to be coupled with the slave component port, wherein the master component port has a bus characteristic that is incompatible with a bus characteristic of the slave component port;

receiving a throughput constraint associated with communication between the master component port and the slave component port, wherein the throughput constraint was input as a high-level program representation;

selecting a first bus port adapter component from a subset of bus port adapter components from a library of a plurality of bus port adapter components, wherein the subset of bus port adapter components are configured to allow communication between the master component port and the slave component port, using the throughput constraint to determine that the first bus port adapter component meets the throughput constraint while one or more other bus adapters of the subset of bus port adapters do not meet the throughput constraint; and generating a logic description of an interconnection fabric using the first bus port adapter component to couple the plurality of components for programming the programmable chip to comprise the plurality of components and the interconnection fabric.

20. The method of claim 1, wherein the interconnection fabric is operable to block transactions to meet the throughput constraint.

21. The system of claim 14, wherein the interconnection fabric is operable to block transactions to meet the throughput constraint.

* * * * *